United States Patent [19]

Avila et al.

[11] Patent Number: 5,115,231
[45] Date of Patent: * May 19, 1992

[54] IMAGE POSITION CONTROL

[75] Inventors: Harold C. Avila, 11498 Pierce St., #AA, Riverside, Calif. 92505; Arthur E. Oberg, Anaheim, Calif.

[73] Assignee: Harold C. Avila, Riverside, Calif.

[ * ] Notice: The portion of the term of this patent subsequent to Jan. 17, 2006 has been disclaimed.

[21] Appl. No.: 291,132

[22] Filed: Dec. 28, 1988

Related U.S. Application Data

[63] Continuation of Ser. No. 694,816, Jan. 25, 1985, Pat. No. 4,799,049.

[51] Int. Cl.$^5$ .............................................. G09G 1/00
[52] U.S. Cl. .................................. 340/709; 340/710; 74/471 XY
[58] Field of Search ...................... 340/710, 709, 706; 178/18; 74/471 XY, 471 R, 491, 198; 338/123, 132, 133

[56] References Cited

U.S. PATENT DOCUMENTS

| | | | |
|---|---|---|---|
| 3,478,293 | 11/1969 | Hooten, Jr. ........................ | 200/6 R |
| 3,823,616 | 7/1974 | Houseman et al. . | |
| 4,546,347 | 10/1985 | Kirsch ................................. | 340/710 |
| 4,712,101 | 12/1987 | Culver ................................. | 340/710 |
| 4,724,715 | 2/1988 | Culver ............................. | 74/471 R |

Primary Examiner—Alvin E. Oberley
Assistant Examiner—Matthew Luu
Attorney, Agent, or Firm—Hawes & Fischer

[57] ABSTRACT

A control system that undergoes lateral and rotational movement to selectively and accurately position an image on the screen of a video monitor. A movement detector is interfaced with a microprocessor to detect and interpret the movement of the control system. The control system comprises a shaft and a bar having a bar axis. The bar is rotatable around the shaft about the bar axis and slideable along the shaft in a direction parallel to the bar axis. Accordingly, movement of the bar with respect to the shaft causes a corresponding movement or positioning of the image on the screen.

20 Claims, 1 Drawing Sheet

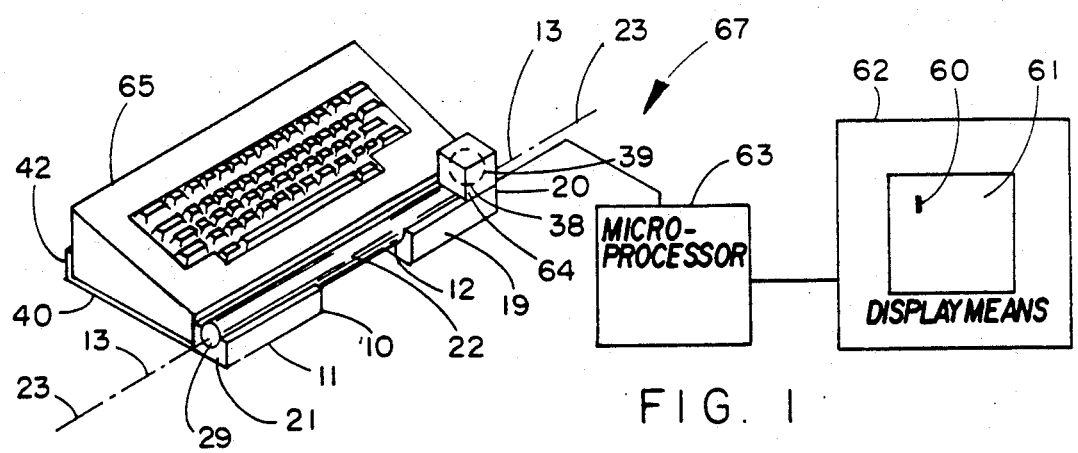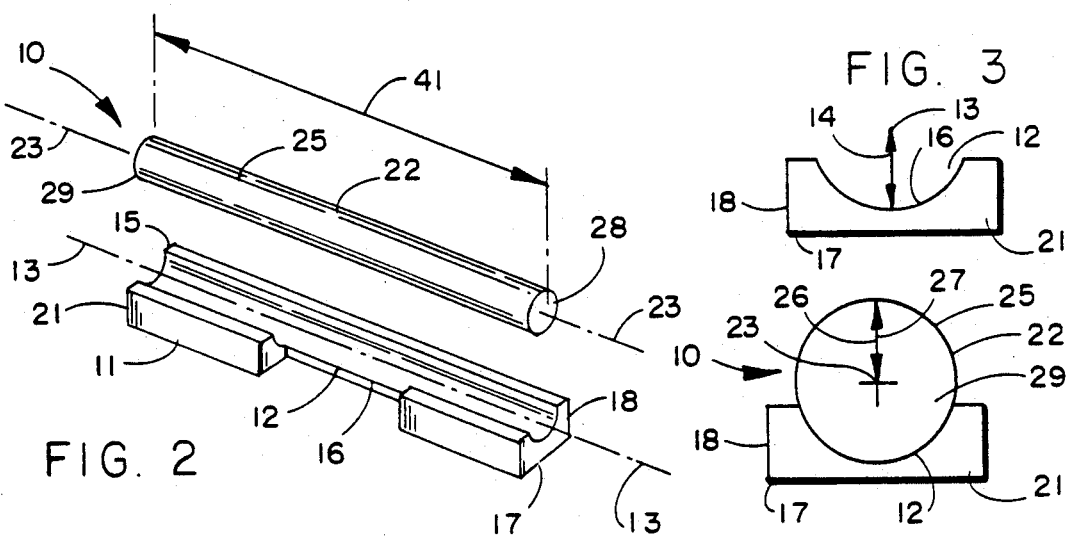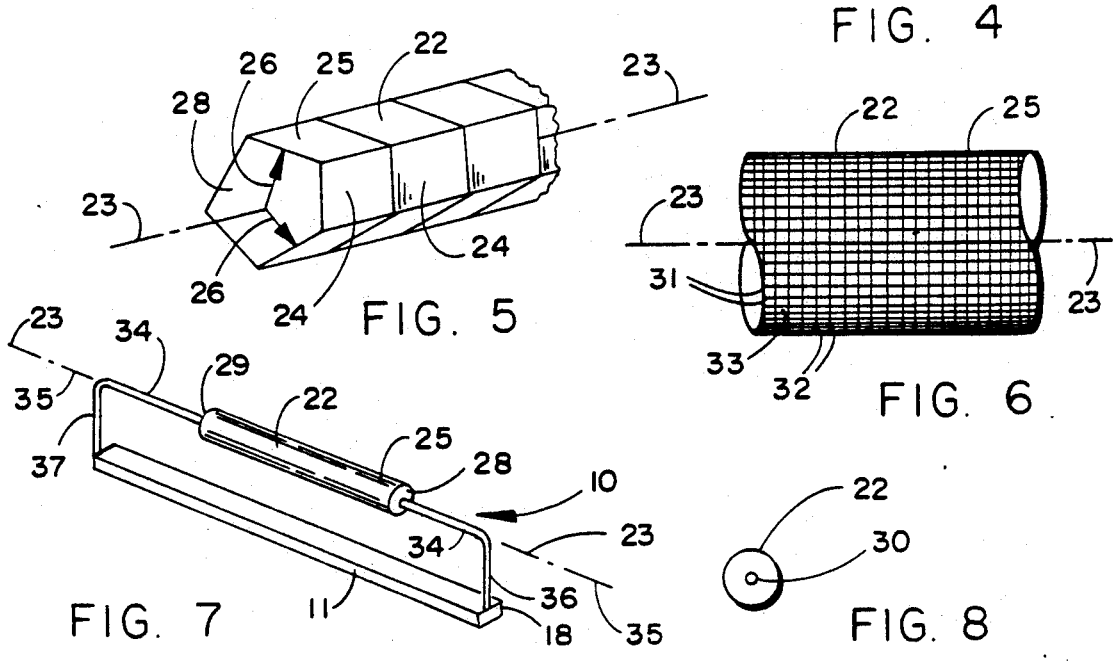

IMAGE POSITION CONTROL

CROSS REFERENCES TO RELATED PATENT APPLICATIONS

This patent application is a continuation of U.S. patent application No. 694,816 filed Jan. 25, 1985, U.S. Pat. No. 4,799,049.

FIELD OF THE INVENTION

The present invention relates to an image positioning system which undergoes both lateral and rotational movement to position an image (i.e. cursor) on a screen, depending upon the movement of said positioning system. The present invention has particular advantage in microprocessor based apparatus having an associated video display, such as a personal computer, a computer typewriter, and the like.

BACKGROUND ART

The use of computers having both a video monitor and a keyboard to input and display information are quite common. Many homes have what is typically referred to as a personal computer or a home computer. Home video games are also quite common, as are video arcade games. Most of the foregoing depend upon locating an image (i.e. cursor) on a screen in order to perform a specific function. For example, in what is frequently called a computer typewriter, a cursor is moved on a screen to indicate the location at which a correction is to be made. The cursor may also be used to select a particular mode of operation. A cursor may be moved to draw lines on a screen, commonly called a video display tube. In many of the foregoing, the keyboard is used to provide information to the computer. In some of these applications, swiftness, speed and accuracy are very desirable. For example, in a computer typewriter, the typist generally is trying to type words as fast as possible. Such typing will be displayed on the screen of a video monitor. The typist will try to make corrections as quickly as possible by moving the cursor around the screen.

In the prior art, the cursor movement is accomplished by a device commonly called a mouse. The mouse generally has the shape of a spherical ball which protrudes through the bottom of a housing. Pushing on the mouse will cause the ball to rotate, which in turn will cause an image on the screen to move. The mouse has no inherent up, down, left or right sense of direction, since it is a sphere and can be rotated in any direction. This makes the mouse very difficult to use in a typing situation where the typist is attempting to type as fast as possible while looking at a screen without looking at the mouse. The typist would have to move the mouse in several directions before finally positioning the cursor at the desired coordinates on the screen. Other prior art devices used in computer typewriters include buttons that can be pushed to cause movement of the cursor. For example, one button could be pushed to provide up direction while another button could be pushed to provide down direction, and so forth. The use of bottons does not allow the typist to speed up the process since the movement of the cursor will be either constant or depend on tapping of the button.

Another prior art device for controlling a cursor on a screen is a joy stick that protrudes up from a base. The joy stick is generally moved forward to cause the cursor to move up. The stick is moved to the side to cause the cursor to move to the side, as is commonly done with many home video games.

All of the prior art devices that control the position of an image on a screen are inconvenient to use because, they are remotely located from the keyboard. In particular, where one wishes to draw on a screen, such as a video display tube, by using a cursor as the point of reference, it is very difficult to use a mouse to draw a straight line, because it is difficult to cause a sphere to move in a straight line. It is equally difficult to draw a precise distance using a joy stick or a pushbutton, because one must estimate for how long the stick must be moved to cause a corresponding movement of the cursor for how long the button must be pushed to cause the movement desired. Consequently, it is almost impossible to precisely draw a line of desired length.

Thus, there are positioning systems in the prior art for positioning images on a screen. However, each has obvious disadvantages which are overcome by the invention to be described in this patent application.

SUMMARY OF THE INVENTION

One object of this invention is to provide a convenient control system for use with keyboards, such as are commonly associated with computers, that would enable a user thereof to quickly develop an instinct and feel for making an image move up, down, left or right on the screen of a video monitor. Another object of this invention is to provide a sensitive and precise control system for positioning an image on a screen.

The invention herein is a control system comprising a body and a bar having a bar axis coupled to the body so that the bar is rotateable with respect to the body about the bar axis and is slideable with respect to the body in a direction parallel to the bar axis. Such rotational and linear movement of the bar is used to position an image on a screen.

In a first preferred embodiment, the bar is rotateable with respect to the body only about the bar axis and is slideable with respect to the body only in a direction parallel to the bar axis. In a second embodiment, the bar has a plurality of surfaces that are spaced the same distance from the bar axis. In a third embodiment, first and second sets of lines are coupled to the bar. The first set of lines are straight and parallel to the bar axis and the second set of lines are perpendicular to the first set of lines. The first and second sets of lines may be printed on paper which in turn may be coupled to the bar.

In another embodiment, a shaft having a shaft axis is coupled to the body. The bar is coupled to the shaft so that the shaft axis is coaxial with the bar axis and the bar is rotateable about and slideable along the shaft.

It is preferable that the bar have an exterior surface having a cylindrical shape and, more particularly, that of a right circular cylinder. As such, the bar can be mated to the body within a notch formed in the body. In the preferred embodiment, the body has a concave surface that defines the notch of the body. Said concave surface is formed with the shape of a right circular cylinder disposed partially around the notch axis wherein, the bar can be received.

In other embodiments of the invention, a ball having a spherical surface is coupled to the bar so that the ball rotates when the bar rotates and the ball rotates when the bar slides. A base may be coupled to the body so that the control system can be secured to a keyboard by placing the base under the keyboard.

BRIEF DESCRIPTION OF THE DRAWINGS

FIG. 1 is a top perspective view of a control system including a body and a cylindrical bar located within a partially cylindrical notch of said body for selectively positioning an image on the screen of a video monitor.

FIG. 2 is a top perspective view of the control system of FIG. 1 with the bar shown above the body for the sake of clarity.

FIG. 3 is a side plan view of the body with the bar removed.

FIG. 4 is the same view as FIG. 3 except that the bar is received within a notch of the body.

FIG. 5 is a fragmentary perspective view of a bar having a plurality of surfaces, according to another embodiment of the invention.

FIG. 6 is a fragmentary perspective view of a bar having first and second sets of lines coupled to the bar, according to yet another embodiment of the invention.

FIG. 7 is a top perspective view of the control system including a fixed shaft, according to a further embodiment of the invention.

FIG. 8 is a side plan view of the bar shown in FIG. 7.

DESCRIPTION OF THE PREFERRED EMBODIMENT

In the embodiment shown in FIG. 1 a positioning system 67 is indicated generally. Positioning system 67 is for positioning an image 60 on a screen 61 based upon the movement of a soon to be described control system 10. The positioning system 67 includes detection means 64 for detecting movement of the control system 10 and a computer (e.g. microprocessor 63) coupled to the movement detector 64. The microprocessor 63 interprets the movement detected by detector 64. The positioning system 67 further includes a video monitor 62 for displaying the microprocessor's interpretation of movement on a screen 61.

In accordance with the present improvement, positioning system 67 comprises a body 11 and a movable bar 22 having a bar axis 23 so that the bar 22 is rotateable with respect to the body 11 about the bar axis 23 and slideable with respect to the body 11 in a direction parallel to the bar axis 23. Such movement of the bar 22 is used to position an image 60 on the screen 61. Thus, the invention herein is a control system 10 that uses movement of the bar 22 to position an image 60 on the screen 61 of a video monitor 62 for use with a movement detector 64 and a computer or microprocessor 63 that interprets such movement.

A preferred embodiment of the control system 10 is shown in FIGS. 2, 3 and 5. In FIG. 2, the bar 22 is shown above the body 11 for the sake of clarity. In FIG. 3, the left side 21 of the body 11 is shown with the bar 22 removed. In FIG. 4, the left side 21 of the body 11 is shown with the bar 22 in place. In the embodiments shown in FIGS. 1, 2, 3, and 4, the bar 22 is rotateable with respect to the body 11 about the bar axis 23 and is slideable with respect to the body 11 in a direction parallel to the bar axis 23. Accordingly, an image 60 can be selectively and advantageously moved on a screen 61 in a straight line over a very precisely determined distance. The movement of the bar 22 parallel to the bar axis 23 will be detected by the movement detector 64, and the microprocessor 63 will be responsive to and interpret the movement detected. Thus, the video monitor 62 will display the movement of image 60 in a straight line across screen 61 corresponding to the movement of bar 22 parallel to the bar axis 23. Typically the image 60 will move left across screen 61 if the bar 22 is moved to the left and right if the bar is moved to the right.

The length 41 of the bar 22 shown in FIG. 2 should be such that sufficient sensitivity can be obtained. For example, it might be desired to have two millimeters of movement of the bar 22 correspond to one millimeter of movement of the image 60 on the screen 61. A bar 22 having a length 41 of 450 millimeters would be suitable for many purposes. Using a bar 22 of greater length 41 would increase the sensitivity in that large movement of the bar 22 parallel to the bar axis 23 could cause very small movement of the image 60 on the screen 61.

The embodiment where the bar 22 slides in a direction parallel to the bar axis 22 is particularly useful when the video monitor 62 is being used to make a drawing where a line is to be formed along a path that follows image 60 across the screen 61. Therefore, straight lines that are only a fraction of a millimeter can be easily drawn on the screen 61 by use of the control system 10.

Making the bar 22 rotateable with respect to the body 11 about the bar axis 23 will allow the use of the control system 10 to move an image 60 up and down on the screen 61. That is to say, rotating the bar 22 about the bar axis 23 in one direction can cause the image 60 to move down the screen 61, and rotating the bar 22 about the bar axis 23 in the opposite direction can cause the image to move up the screen. A large rotation of the bar 22 about the bar axis 23 can correspond to a very small movement of the image 60 on a screen 61. Thus, virtually any desired sensitivity can be obtained by use of the control system 10. The control system 10 could even permit one complete rotation of the bar 22 to correspond to a fraction of a millimeter of movement of the image 60 on the screen 61. As shown in FIG. 4, for a bar 22 that has a cylindrical shape, a radius 27 of eight to nine millimeters would be suitable for most purposes.

Movement of the bar 22 can be detected in several ways. One suitable movement detector 64 would direct electromagnetic radiation towards the exterior surface 25 of the bar 22 to be partially or totally reflected from the exterior surface 25 towards a suitable sensor (not shown). The embodiment of the bar 22 shown in FIG. 5 has a plurality of surfaces 24 that are of equal distance 26 from the bar axis 23. It is contemplated that movement detector 64 would direct electromagnetic radiation from an associated source thereof to the plurality of surfaces 24 of the bar 22 in a narrow ray so that rotation of the bar 22 would result in some or all of the ray being reflected towards the sensor when the bar 22 was aligned in a particular orientation. Movement of the bar 22 out of its particular orientation would cause the reflected ray to miss the sensor. In this manner, the sensor would receive some, all, or none of a ray each time the bar 22 was precisely positioned in or out of a predetermined orientation. This can be accomplished by having each of the plurality of surfaces 24 of bar 22 being flat and each being the same distance 26 from the bar axis 23.

The embodiment shown in FIG. 5 illustrates a bar 22 that is shaped like a pentagon. Each time one of the five surfaces 24 of the bar 22 is particularly aligned with a radiation source, a ray would be reflected back to a sensor whereby the movement of bar 22 would be detected. Such movement can then be interpreted by the microprocessor 63 with the result of positioning of an image 60 on the screen 61 of video monitor 62. The foregoing technique could be used to move the image 60 up or down the screen 61. Similarly, another detector 64 using reflected electromagnetic radiation could sense the lateral sliding of the bar 22 shown in FIG. 5, since the plurality of surfaces could cause an interruption in a reflected ray as the bar 22 slides in a direction parallel to the bar axis 23.

The bar 22 shown in FIG. 5 could be coupled to the body 11 in the same manner as the bar 22 of FIG. 7 is coupled to the body 11 by slidably mounting the bar 22 on a shaft 34 which will be discused hereinafter. The bar 22 shown in FIG. 5 has the shape of a pentagon for the purpose of example only. However, it is preferred that there be a sufficient plurality of surfaces 24 of the bar 22 so that the exterior surface 25 thereof approaches that of a cylinder. This would result in a highly precise and accurate positioning system 67, since a very small movement of the bar 22 would be sufficient to cause a corresponding change in the magnitude of the reflected ray which is received by the sensor of movement detector 64.

In the embodiment of FIG. 6, first and second sets of lines 31 and 32 are coupled to the bar 22. The first set of lines 31 and second set of lines 32 will permit detection of the movement of bar 22 in a manner as previously described when a ray of electromagnetic radiation is directed towards the bar 22 and is reflected by the bar 22 to a sensor, except when the bar 22 is moved so that the ray strikes one of the lines of the first or second sets 31 or 32. Thus, movement of the bar 22 will interrupt the reflection of the ray of electromagnetic radiation to the sensor when such ray strikes one of the lines of the first set of lines 31 or the second set of lines 32. It is preferred that the first set of lines 31 be straight and parallel to the bar axis 23 and the second set of lines 32 be straight and perpendicular to the first set of lines 31. Such an arrangement would simplify the task of detecting the movement of the bar 22.

As previously described, a ray of electromagnetic radiation would be directed to the exterior surface 25 of the bar 22 of FIG. 6 for the purpose of detecting the movement in a direction parallel to the bar axis 23, which movement could be indicated by breaks in the reflected ray of electromagnetic radiation caused by striking any line in the second set of lines 32. Likewise, a second ray of electromagnetic radiation could be directed to the exterior surface 25 of the bar 22 and the reflection of such ray would be interrupted by any line of the first set of lines 31. Thus, lateral movement in a direction parallel to the bar axis 23 can be detected as well as rotational movement of the bar 22 about the bar axis 23. This embodiment would permit the detection of extremely minute movements of the bar 22. The first set of lines 31 and second set of lines 32 could be coupled to the bar 22 by printing the lines on paper 33 and then coupling the paper 33 to the bar 22 by means of a suitable adhesive, such as glue.

In the embodiment of FIGS. 7 and 8, the control system 10 further comprises a shaft 34 having a shaft axis 35 coupled to the body 11, wherein the bar 22 is coupled to the shaft 34 so that the shaft axis 35 is coincident with the bar axis 23 and the bar 22 is both rotateable about and slideable along the shaft 34. As is best shown in FIG. 8, the bar 22 has a hole 30 extending therethrough. The hole 30 should have a shape such that the bar 22 will be able to slide parallel to the bar axis 23 and rotate about the bar axis 23. The shaft 34 should be suspended so that the bar 22 does not make contact with the body 11. This may be accomplished by a left support 37 and right support 36. The shaft 34 and the left and right supports 37 and 36 could be made from a metal rod that is bent in two places. The left support 37 and the right support 36 could be coupled to the body 11 by molding the body 11 with the left support 37 and the right support 36 in place during molding. In this regard, the body 11 could be made from plastic. It is preferred that the hole 30 and the shaft 34 have a cylindrical shape so that the bar 22 can be mated to the shaft 34 yet still rotate and slide relative thereto.

Referring once again to FIGS. 1–4, the bar 22 has an exterior surface 25 having a cylindrical shape. It is preferred that the exterior surface 25 of bar 22 have the shape of a right circular cylinder. It is also preferred that the body 11 have a notch 12 and that the bar 22 be situated in the notch 12. More particularly, the body 11 has a notch axis 13 and an upper side 15 having a concave surface 16 that defines the notch 12. In this embodiment, the concave surface 16 that defines the notch 12 of the body 11 will hold the bar 22. The distance 14 between the notch axis 13 and the concave surface 16 of the body 11 should be essentially equal to the radius 27 of the bar 22 so the bar 22 will mate with the concave surface 16 that defines the notch 12 of the body 11 yet permit the bar 22 to rotate and slide with respect to said concave surface 16. Thus, the notch axis 13 is essentially parallel with the bar axis 23.

Approximately eight to nine millimeters would be suitable for many applications as the distance 14 between the notch axis 13 and the concave surface 16 of the body 11. This distance would also be suitable as the radius 27 of the bar 22. The bar 22 and the concave surface 16 that defines the notch 12 of the body 11 should be made of materials (e.g. plastic) that will permit the sliding and rotating of the bar 22 when the bar 22 is situated in the notch 12 of the body 11. Likewise, it is preferred that the bar 22 be hollow to reduce weight and friction, whereby the bar 22 can be easily slid and rotated.

In FIG. 1, a ball 38 is shown connected to the body 11 adjacent one side thereof, for purposes of illustration. However, it is preferable that the ball 38 be connected to the body 11 so that the ball 38 is half way between the left and right sides 29 and 28 of bar 22. The ball 38 has a spherical surface 39 coupled to the bar 22 so that the bar 22 is in contact with the ball 38 which will cause the ball 38 to rotate when the bar 22 is rotated or slid. Movement of the ball 38 may be detected in a manner similar to that described for detecting of movement of the bar.

A base 40 may be coupled to the body 11 so that the control system 10 can be secured to a keyboard 65 by placing the base 40 under the keyboard 65, as shown in FIG. 1. The base 40 may be coupled to the body 11 by the use of adhesive or other conventional fastening means. It is preferred that the base 40 be flat and relatively thin as to fit under the keyboard 65. The weight of the keyboard 65 on the base 40 should hold the control system 10 in place. An upwardly extending lip 42 may be coupled to the base 40 to further help prevent movement of the base 40. It is preferred that the size and dimensions of the base 40 be approximately the same as the size and dimensions of the keyboard 65. The control system 10 should be positioned against the keyboard 65 so that the rear side 18 of the body 11 is against the keyboard 65, as shown in FIG. 1. Thus, the weight of the keyboard 65 on the base 40 and the contact of the rear side 18 of the body 11 with the keyboard 65 will provide for a secure and convenient positioning of the control system 10.

The body 11, as previously indicated, may be made of various materials including plastic. The entire body 11 including the notch 12 may be shaped by using a mold. The ball 38 and base 40 may also be made of plastic.

The disadvantages inherent in prior art image positioning systems are overcome by the control system 10 of the present invention. First, the control system 10 is located close to the keyboard 65 which facilitates access to both. The body 11 is adjacent the keyboard 65 so that the bar 22 is always within the same volume of space with reference to the keyboard 65. Hence, the bar 22 can be easily located without removing one's eyes from the screen 61. Furthermore, because the bar 22 moves laterally and rotationally, two dimensional positioning of an image can be obtained. That is, the image 60 can be moved up or down and sideways on the screen 61. The control system 10 further conserves space, as it can be located next to the keyboard 65, as shown in FIG. 1. The control system 10 can also be connected directly to the keyboard 65 so as to consume virtually no desk space.

It is to be understood that the invention is not limited to the exact details of construction, operation and exact materials as are shown and described, and obvious modifications and equivalents will be apparent to one skilled in the art. Therefore, the invention is to be limited only by the scope of the appended claims.

We claim:

1. A system for selectively and accurately positioning an image on a screen, said system comprising:
   display means having the screen on which said image is to be displayed;
   stationary support means having a longitudinally extending axis;
   movable image position control means mated to said support means and adapted to slide laterally on said support means in a direction parallel to the longitudinally extending axis thereof and rotate relative to said support means in a direction perpendicular to said axis;
   means for detecting the lateral and rotational movements of said image position control means relative to the longitudinal axis of said support means; and
   computer means interconnected between said movement detecting means and said display means for causing the image to move on said screen in directions which correspond to the movements of said image position control means.

2. The image positioning system recited in claims 1, wherein said support means and said image position control means are coaxially arranged relative to one another.

3. The image positioning system recited in claim 1, wherein said image position control means comprises a bar.

4. The image positioning system recited in claim 1, wherein said computer means includes a keyboard, said positioning system further comprising means for interconnecting said support means to said keyboard.

5. The image positioning system recited in claim 4, wherein said interconnecting means includes means by which to suspend said support means relative to said keyboard so that said image position control means is spaced from said keyboard and movable independently thereof.

6. The image positioning system recited in claim 1, wherein said computer means is a microprocessor controlled personal computer or computer typewriter.

7. A system for positioning an image on a display, said system comprising:
   support means including a stationary guide track having a longitudinally extending axis;
   image position control means mated to the guide track of said support means and adapted to slide on said guide track relative to said support means in a direction parallel to the longitudinally extending axis of said track and to rotate relative to said guide track in a direction perpendicular to said longitudinally extending axis;
   means for detecting the sliding and rotational movements of said image position control means; and
   means for causing the image to move on the display in directions which correspond to the movements of said image position control means relative to said support means.

8. The system recited in claim 7, wherein the guide track of said support means includes a cradle within which to receive said image position control means, such that said image position control means is moved laterally through said cradle and rotated within said cradle.

9. The system recited in claim 7, wherein said means for causing said image to move on the display includes a computer having a keyboard, said support means being coupled to the keyboard so that said image position control means is movable relative to said keyboard.

10. The system recited in claim 9, further comprising a base upon which to receive said computer keyboard, said base being attached to said support means to couple said support means to the keyboard and permit said image position control means to be movable relative to said keyboard.

11. The system recited in claim 7, wherein said image position control means has at least one set of lines located thereon by which to provide an indication of the rotational movement of said image position control means relative to said support means, said set of lines aligned parallel to the longitudinally extending axis of said guide track.

12. The system recited in claim 7, wherein said image position control means has at least one set of lines located thereon by which to provide an indication of the lateral movement of said image position control means relative to said support means, said set of lines aligned perpendicular to the longitudinally extending axis of said guide track.

13. The system recited in claim 7, wherein said image position control means has first and second sets of lines located thereon, said first set of lines aligned parallel to the longitudinally extending axis of said guide track and said second set of lines aligned perpendicularly to said first set of lines.

14. For a microprocessor based system having a display on which an image can be moved, a system for moving the image on the display, comprising:
   an elongated guide member having a longitudinally extending axis;
   image position control means mated to said guide member so as to be supported for movement relative to said guide member, said image position control means adapted to slide laterally on said guide member in a direction parallel to the longitudinally extending axis thereof and said image position control means also being adapted to rotate relative to said guide member in a direction perpendicular to said longitudinally extending axis;

means for detecting the lateral and rotational movements of said image position control means; and means for causing the image to move on the display in direction which correspond to the movements of said image position control means relative to said guide member.

15. The invention recited in claim 14, wherein said microprocessor based system also has a keyboard, and said system for moving the image on the display further comprises means for coupling said guide member to the keyboard so that said image position control means is movable relative to said keyboard.

16. The invention recited in claim 15, wherein aid means for coupling said guide member to the keyboard is a flat base which is sized to fit under and receive said keyboard thereon, said base being attached to said guide member.

17. The invention recited in claim 14, wherein said image position control means has at least one set of lines located thereon by which to provide an indication of the rotational movement of said image position control means relative to said guide member, said set of lines aligned parallel to the longitudinally extending axis of said guide member.

18. The invention recited in claim 14, wherein said image position control means has at least one set of lines located thereon by which to provide an indication of the lateral movement of said image position control means relative to said guide member, said set of lines aligned perpendicular to the longitudinally extending axis of said guide member.

19. The invention recited in claim 14, wherein said image position control means has first and second sets of lines located thereon, said first set of lines aligned parallel to the longitudinally extending axis of said guide member and said second set of lines aligned perpendicularly to said first set of lines.

20. A control assembly by which a utilization device can be selectively controlled, said control assembly comprising, in combination:

support means including a guide channel having a longitudinally extending axis;

control means mated by said guide channel and movable relative to said support means, said control means adapted for lateral movement through said guide channel in a direction parallel to the longitudinal extending axis thereof and said control means adapted to be rotated within said guide channel and relative to said support means in a direction perpendicular to said longitudinally extending axis; and means for detecting the lateral and rotational movements of said control means relative to said support means for controlling the operation of the utilization device in response to the movements detected.

* * * * *